(12) United States Patent
Araki (10) Patent No.: US 11,108,342 B2
(45) Date of Patent: Aug. 31, 2021

(54) VIBRATION-TYPE DRIVING APPARATUS USING SINTERED BODY IMPREGNATED WITH RESIN, ELECTRONIC APPARATUS, AND MOVABLE BODY

(71) Applicant: CANON KABUSHIKI KAISHA, Tokyo (JP)

(72) Inventor: Yasuyuki Araki, Tokyo (JP)

(73) Assignee: CANON KABUSHIKIKAISHA, Tokyo (JP)

( * ) Notice: Subject to any disclaimer, the term of this patent is extended or adjusted under 35 U.S.C. 154(b) by 687 days.

(21) Appl. No.: 16/022,916

(22) Filed: Jun. 29, 2018

(65) Prior Publication Data

US 2019/0013745 A1    Jan. 10, 2019

(30) Foreign Application Priority Data

Jul. 5, 2017 (JP) .............................. JP2017-131981

(51) Int. Cl.
  *H02N 2/04*    (2006.01)
  *H02N 2/00*    (2006.01)
  (Continued)

(52) U.S. Cl.
  CPC ............ *H02N 2/046* (2013.01); *B25J 9/0009* (2013.01); *G02B 7/09* (2013.01); *G03B 3/10* (2013.01);
  (Continued)

(58) Field of Classification Search
  CPC ........ H02N 2/046; H02N 2/007; H02N 2/103; H02N 2/0015; H02N 2/22; H02N 2/0055;
  (Continued)

(56) References Cited

U.S. PATENT DOCUMENTS

| 9,417,424 | B2 | 8/2016 | Sumitomo |
| 2013/0315519 | A1 | 11/2013 | Martinez |
| 2016/0082502 | A1* | 3/2016 | Appleby ................. C08L 63/00 164/369 |

FOREIGN PATENT DOCUMENTS

| CN | 102843062 A | 12/2012 |
| CN | 103370450 A | 10/2013 |

(Continued)

OTHER PUBLICATIONS

Office Action issued in Chinese Appln. No. 201810721648.6 dated Nov. 28, 2019. English translation provided.

*Primary Examiner* — Emily P Pham
(74) *Attorney, Agent, or Firm* — Rossi, Kimms & McDowell LLP (57) ABSTRACT

A vibration-type driving apparatus is capable of, in a case where a sintered body is impregnated with resin, preventing the resin that has hardened from interfering with other members. A movable body is brought into pressure contact with a vibrating body having an electro-mechanical energy conversion element and an elastic body. The vibrating body and the movable body are moved relatively to each other through vibrations excited in the vibrating body. The movable body has a frictional surface including the sintered body impregnated with the resin and comes into contact with the vibrating body. The movable body has a sloped surface adjacent to the frictional surface in a cross section perpendicular to a direction in which the vibrating body and the movable body move relatively to each other. An angle formed by the frictional surface and the sloped surface is greater than 90 degrees and less than 180 degrees.

19 Claims, 10 Drawing Sheets

(51) Int. Cl.
  *G02B 7/09* (2021.01)
  *G03B 13/36* (2021.01)
  *G03B 5/00* (2021.01)
  *B25J 9/00* (2006.01)
  *G03B 3/10* (2021.01)
  *H02N 2/10* (2006.01)
  G02B 27/64 (2006.01)

(52) U.S. Cl.
  CPC .............. *G03B 5/00* (2013.01); *G03B 13/36* (2013.01); *H02N 2/007* (2013.01); *H02N 2/0015* (2013.01); *H02N 2/103* (2013.01); *H02N 2/22* (2013.01); *G02B 27/646* (2013.01); *G03B 2205/0007* (2013.01); *G03B 2205/0046* (2013.01); *G03B 2205/0061* (2013.01)

(58) Field of Classification Search
  CPC . G03B 3/10; G03B 13/36; G03B 5/00; G03B 2205/0046; G03B 2205/0061; G03B 2205/007; B25J 9/0009; G02B 7/09; G02B 27/646
  See application file for complete search history.

(56) References Cited

FOREIGN PATENT DOCUMENTS

| | | |
|---|---|---|
| JP | H03273877 A | 12/1991 |
| JP | H11136973 A | 5/1999 |
| JP | 2008160989 A | 7/2008 |
| JP | 2008228453 A | 9/2008 |

* cited by examiner

VIBRATION-TYPE DRIVING APPARATUS USING SINTERED BODY IMPREGNATED WITH RESIN, ELECTRONIC APPARATUS, AND MOVABLE BODY

BACKGROUND OF THE INVENTION

Field of the Invention

The present invention relates to a vibration-type driving apparatus using a sintered body impregnated with resin, an electronic apparatus, and a movable body.

Description of the Related Art

There is known a vibration-type driving apparatus which brings a vibrating body, which uses an electro-mechanical energy conversion element, and a movable body into pressure contact with each other, excites predetermined vibrations in the vibrating body, and apply frictional driving force from the vibrating body to the movable body, causing the vibrating body and the movable body to move relatively to each other. In this vibration-type driving apparatus, large holding torque or holding force is generated due to the pressure contact. Thus, even when an external force acts on the vibration-type driving apparatus, the positional relationship between the vibrating body and the movable body is maintained in a nonenergized state, and moreover, there is no need for a special mechanism or energy for maintaining the positional relationship between the vibrating body and the movable body.

It has been proposed that on frictional surfaces (frictional sliding surfaces) of the vibrating body and the movable body being in contact with each other in the vibration-type driving apparatus, a stainless sintered body is used as a frictional material for the vibrating body or the movable body (see, for example, Japanese Laid-Open Patent Publication (Kokai) No. 2008-228453).

Merely using the stainless sintered body as the frictional material may not achieve satisfactory frictional characteristics, and satisfactory holding torque or holding force may not be obtained depending on an arrangement of the vibrating body, environmental conditions, and driving conditions. To avoid this problem, the stainless sintered body is subjected to such treatment as impregnation with a chemical compound so as to improve frictional characteristics of the frictional material.

However, it is feared that if the stainless sintered body is coated with a chemical compound so as to impregnate the stainless sintered body with the chemical compound, the treatment (impregnation) would not be enough if a sufficient amount of chemical compound is not coated on a surface of the stainless sintered body constituting the frictional material. On the other hand, it is feared that if an excessive amount of chemical compound is coated on the surface of the stainless sintered body, the time period required to grind the chemical compound so as to adjust the frictional material to a desired thickness after the coated chemical compound hardens will increase. It is also feared that a part of the chemical compound will flow out to a side face of the frictional material and harden, making the frictional material larger, and as a result, the frictional material will interfere with other components of the vibration-type driving apparatus.

SUMMARY OF THE INVENTION

The present invention provides a vibration-type driving apparatus which is capable of, in a case where a process for impregnating a sintered body with a chemical compound is carried out, preventing the chemical compound that has hardened from interfering with other members, an electronic apparatus, and a movable body.

Accordingly, the present invention provides a vibration-type driving apparatus comprising a vibrating body configured to use an electro-mechanical energy conversion element and an elastic body, and a movable body configured to be brought into pressure contact with the vibrating body, wherein the vibration-type driving apparatus moves the vibrating body and the movable body relatively to each other through vibrations excited in the vibrating body, the movable body has a frictional surface that includes a sintered body impregnated with at least resin and comes into contact with the vibrating body, the movable body also has a sloped surface adjacent to the frictional surface in a cross section perpendicular to a direction in which the vibrating body and the movable body move relatively to each other, and an angle formed by the frictional surface and the sloped surface of the movable body is greater than 90 degrees and less than 180 degrees.

According to the present invention, in a case where a process for impregnating a sintered body with a chemical compound is carried out, the chemical compound that has hardened is prevented from interfering with other members.

Further features of the present invention will become apparent from the following description of exemplary embodiments (with reference to the attached drawings).

DESCRIPTION OF THE EMBODIMENTS

Embodiments of the present invention will now be described in detail with reference to the drawings. Arrangements of the embodiments described below, however, are examples for illustrative purposes only, and the scope of claims is not limited to the arrangements of the embodiments described below.

Figure 1:
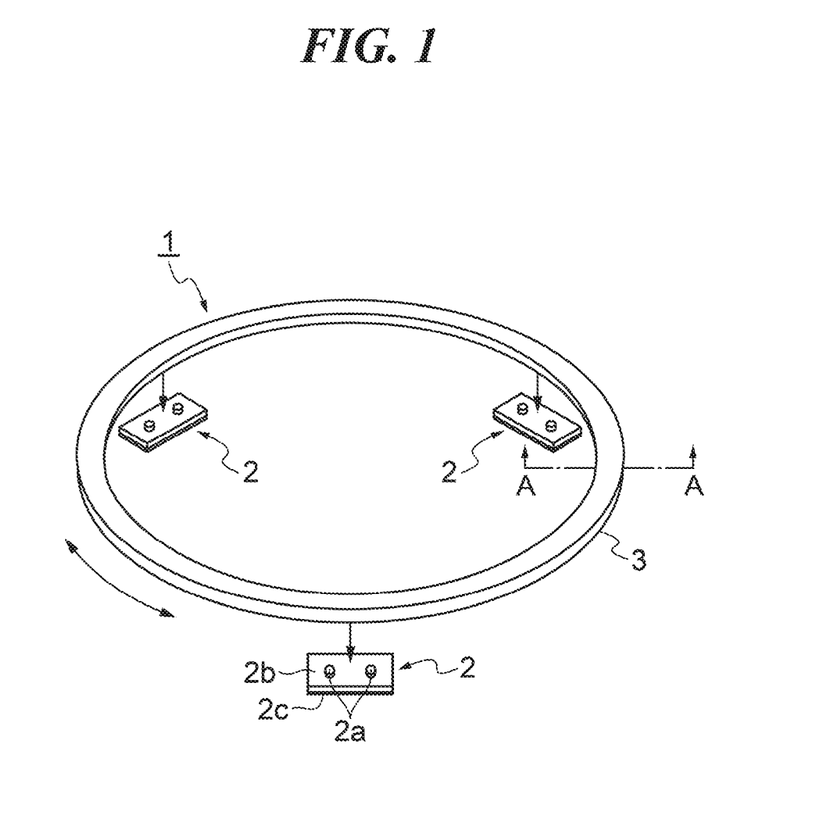
FIG. 1 is an exploded perspective view schematically showing an arrangement of a vibration-type actuator which is a vibration-type driving apparatus according to an embodiment of the present invention.

FIG. 1 is an exploded perspective view schematically showing an arrangement of a vibration-type actuator which is a vibration-type driving apparatus according to an embodiment of the present invention. Referring to FIG. 1, the vibration-type actuator 1 has three vibrating bodies 2 and a ring-shaped movable body 3. The three vibrating bodies 2 are placed on a base, not shown, such that a direction connecting two projecting portions 2a corresponds to a direction of a tangent of a circle concentric with an inner periphery or outer periphery of the movable body 3. At this time, ends of the projecting portions 2a, to be described later, of each vibrating body 2 and a frictional surface 3c, to be described later, of the movable body 3 are brought into pressure contact with each other by a pressurization means, not shown. It should be noted that after the three vibrating bodies 2 identical in specification are placed on the base, vibration-type actuators with various outer diameters and inner diameters can be fabricated by changing sizes (shapes) of the base, on which the moving bodies 2 are placed, and the movable body 3. Each vibrating body 2 has an elastic body 2b, which is a substantially rectangular flat base material, a substantially rectangular flat piezoelectric element 2c, which is joined to one side of the elastic body 2b by an adhesive agent or the like, and the two projecting portions 2a which are provided on the other side of the elastic body 2b opposite to the side of the elastic body 2b to which the piezoelectric element 2c is joined.

Figure 2:
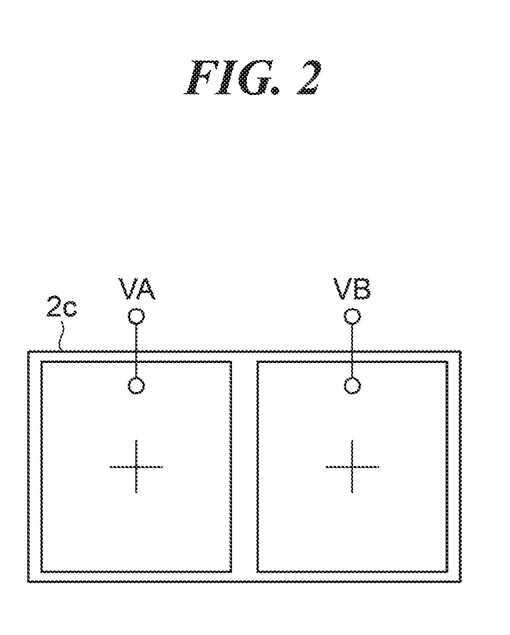
FIG. 2 is a plan view showing an electrode structure of a piezoelectric element which a vibrating body of the vibration-type driving apparatus has.

FIG. 2 is a plan view showing an electrode structure of the piezoelectric element 2c which the vibrating body 3 of the vibration-type driving apparatus 1 has. In the piezoelectric element 2c, which is an example of an electro-mechanical energy conversion element, two electrode areas equally split with respect to a longitudinal direction are formed, and polarizing directions in these electrode areas are the same (+). For example, AC voltages VA and VB with frequencies close to resonance frequencies of an out-of-plane primary bending vibration mode and an out-of-plane secondary bending vibration mode, respectively, of the elastic body 2b are applied to the respective two electrodes of the piezoelectric element 2c. As a result, vibrations in the out-of-plane primary bending vibration mode and vibrations in the out-of-plane secondary bending vibration mode are excited in the vibrating body 2. Here, the out-of-plane primary bending vibration mode is a vibration mode in which bending vibrations are excited in a short-side direction, and two nodal lines substantially parallel to a long side appear in the vibrating body 2. The out-of-plane secondary bending vibration mode is a vibration mode in which bending vibrations are excited in a long-side direction, and three nodal lines substantially parallel to the short side appear in the vibrating body 2. In the vibrating body 2, the two projecting portions 2a are provided at locations corresponding to anti-nodes of vibrations in the out-of-plane primary bending vibration mode and corresponding to anti-nodes of vibrations in the out-of-plane secondary bending vibration mode. These vibrations are combined to produce oval motions in the projecting portions 2a, but detailed description thereof is omitted here because the principle on which such oval motions are produced is well known. In the vibration-type actuator 1, the oval motions produced in the projecting portions 2a of each vibrating body 2 brought into pressure contact with the movable body 3 drive the movable body 3 by relatively moving it in a circumferential direction thereof. This causes the movable body 3 to rotate in the circumferential direction thereof (direction indicated by arrows in FIG. 1). It should be noted that in the vibration-type actuator 1, the movable body 3 may be placed on the base, and each vibrating body 2 may be relatively moved in the circumferential direction of the movable body 3.

Figure 3:
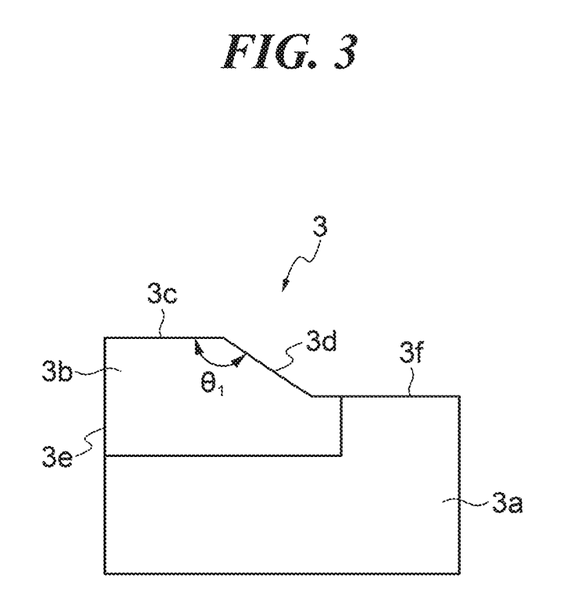
FIG. 3 is a cross-sectional view taken along a line A-A in FIG. 1.

FIG. 3 is a cross-sectional view of the movable body 3 taken along a line perpendicular to the direction in which the vibrating body 2 and the movable body 3 move relatively to each other (a cross-sectional view taken along a line A-A in FIG. 1). Referring to FIG. 3, the movable body has a main body portion 3a, which is substantially rectangular in cross section, and a frictional portion 3b, which is substantially trapezoidal in cross section and projects from the main body portion 3a toward the vibrating bodies 2. It should be noted that in FIG. 3, the right-hand side corresponds to an outer peripheral side of the movable body 3, and the left-hand side corresponds to an inner peripheral side of the movable body 3. A frictional surface 3c, which comes into contact with the vibrating bodies 2, is formed on a top end of the frictional portion 3b on the vibrating body 2 side, and a sloped surface 3d is formed on a side face of the frictional portion 3b on the outer peripheral side. It should be noted that a side face of the frictional portion 3b on the inner peripheral side is comprised of a vertical surface 3e vertical to the frictional surface 3c. On the inner peripheral side of the sloped surface 3d, the sloped surface 3d is adjacent to the frictional surface 3c. An angle $\theta_1$ formed by the frictional surface 3c and the sloped surface 3d of the movable body 3 is greater than 90 degrees and less than 180 degrees. The angle $\theta_1$ is preferably not less than 110 degrees and not more than 160 degrees. Moreover, the angle $\theta_1$ is more preferably not less than 120 degrees and not more than 150 degrees. Furthermore, the angle $\theta_1$ is most preferably greater than 120 degrees and less than 150 degrees. The movable body 3 also has a staying surface 3f which is adjacent to the sloped surface 3d and on an opposite side of the frictional surface 3c. As shown in FIG. 3, with the frictional surface 3c facing upward, the staying surface 3f is at a lower level than the frictional surface 3c and parallel to the frictional surface 3c. It should be noted that the frictional surface 3c and the staying surface 3f may not completely be parallel to each other. The staying surface 3f may be sloped down toward the sloped surface 3d. The frictional surface 3c, the sloped surface 3d, the vertical surface 3e, and the staying surface 3f are formed over the whole circumference of the movable body 3. The movable body 3 includes a sintered body obtained by hardening a sintered body (stainless sintered body) of SUS402J2 powders, which is a type of martensite stainless steel, by quenching, and the frictional portion 3b is impregnated with, for example, epoxy resin. The entire movable body 3 may be comprised of the sintered body, or a part of the movable body 3 including a frictional surface rubbing against the vibrating bodies 2, for example, the frictional portion 3b may be comprised of the sintered body.

In general, when a vibration-type driving apparatus that brings a vibrating body into pressure contact with a movable body is left in a humid environment, moisture becomes absorbed to a frictional surface of the movable body, causing holding torque or holding force to decrease on startup of the vibration-type driving apparatus at a later time. Namely, in a dry environment, no moisture becomes adsorbed to the frictional surface of the movable body, and therefore, a sufficient real contact area where the frictional surface of the movable body and the vibrating body are reliably in contact with each other is secured, but when moisture becomes adsorbed to the frictional surface, a water film comprised of the moisture supports the movable body via the frictional surface. The state in which the water film supports the movable body corresponds to a mixed lubricating state or a fluid lubricating state, but in this state, the real contact area cannot be secured to a satisfactory level because of the water film. Moreover, moisture has much less resistance than a solid with respect to a shearing direction and thus has low frictional force (resistance) acting on the movable body. Because of these combined factors, holding torque or holding force decreases in the vibration-type driving apparatus. Accordingly, in the vibration-type actuator 1 according to the present embodiment, the frictional surface 3c coming into contact with the vibrating bodies 2 is comprised of a stainless sintered body which is a porous material, and pores of the sintered body are at least partially impregnated with, for example, epoxy resin. As a result, when the vibrating bodies 2 come into contact with the frictional surface 3c, the impregnating epoxy resin transfers to the frictional surface 3c. Resin such as epoxy resin is relatively soft, and hence the real contact area of the frictional surface 3c and the vibrating body 2 becomes larger than in a state where the frictional surface 3c has a hard stainless metallic surface exposed. This prevents decrease of holding torque or holding force. Moreover, the amount of epoxy resin transferring to the frictional surface 3c depends on the amount of impregnating epoxy resin, and therefore, to prevent decrease of holding torque or holding force, the amount of impregnating epoxy resin should be increased. Namely, by adjusting the amount of impregnating epoxy resin, the frictional surface 3c with desired characteristics is appropriately obtained. Furthermore, as a result of friction, a film of the transferred epoxy resin is formed on the frictional surface 3c, and hence metallic contact is prevented from occurring between the vibrating body 2 and the frictional surface 3, which improves abrasion resistance of the vibrating body 2 and the frictional surface 3c.

If the frictional surface 3c of the frictional portion 3b has a too high surface porosity (the proportion of area occupied by pores in a surface), the frictional surface 3c would excessively wear due to lack of strength of the frictional portion 3b, causing decrease of holding torque or holding force. On the other hand, if the surface porosity is too low, the amount of epoxy resin transferring to the frictional surface 3c decreases due to a decrease in the amount of epoxy resin included in the frictional portion 3b, and as a result, the real contact area of the frictional surface 3c and the vibrating body 2 would never increase, causing decrease of holding torque or holding force as well. To avoid this problem, in the vibration-type actuator 1 according to the present embodiment, the surface porosity of the frictional surface 3c is set to not less than 5% and not more than 30%. This prevents the surface porosity from raising or lowering than necessary and prevents decrease of holding torque or holding force by preventing decrease of the real contact area of the frictional surface 3c and the vibrating body 2.

Figure 4A:
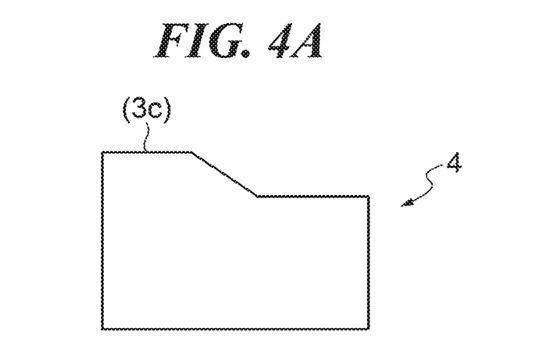
FIGS. 4A to 4C are process diagrams useful in explaining a method of manufacturing a movable body.

FIGS. 4A to 4C are flowcharts useful in explaining a method of manufacturing the movable body 3. First, SUS402J2 powders (with an average grain size of 75 μm) are sintered to form a ring-shaped sintered body 4 (FIG. 4A). The ring-shaped sintered body 4 is geometrically similar in cross section to the movable body 3. At this time, each SUS420J2 powder is held at a temperature not more than a melting point, joined together to form a ring-shaped body, which in turn is rapidly cooled to obtain the ring-shaped sintered body 4. Since SUS420J2 is hardened by quenching by being rapidly cooled, the hardness of the frictional surface 3c of the movable body 3 manufactured from the obtained ring-shaped sintered body 4 is improved, which increases the wear resistance of the frictional surface 3c. It should be noted that after the ring-shaped sintered body 4 is formed, an area corresponding to the frictional surface 3c may be subject to a quenching process through laser radiation so as to reliably harden the frictional surface 3c by quenching. In the quenching process through laser radiation, only a limited range is heated, and hence, a range where contraction occurs during cooling after heating can be limited, which prevents the ring-shaped sintered body 4 from becoming deformed than necessary. Moreover, the frictional surface 3c is not hardened beyond a necessary range in the frictional surface 3c, and therefore, when the movable body 3 with desired dimensions is manufactured by cutting surfaces of the ring-shaped sintered body 4, the cutting is easy, which leads to increased manufacturing efficiency of the movable body 3. It should be noted that SUS316, which is a type of austenite stainless, is used as a substitute for SUS420J2, a hard nitride layer is formed by an ion nitriding method so as to improve abrasion resistance.

Figure 4B:
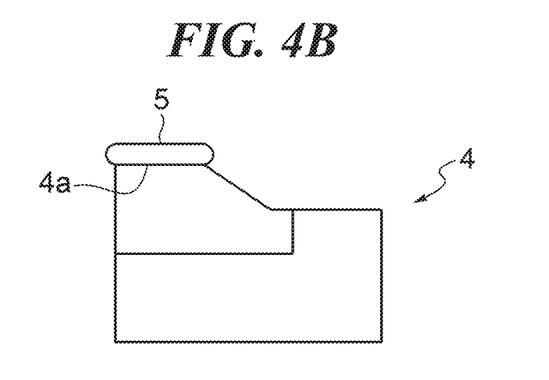
Figure 4C:
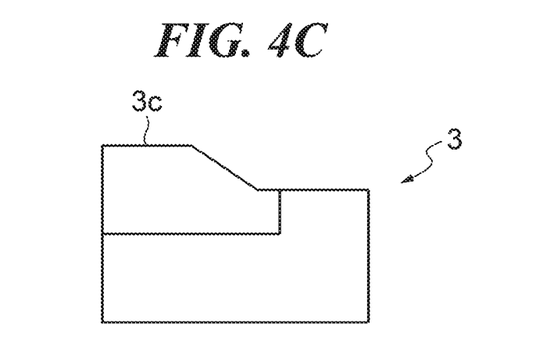

Next, liquid epoxy resin 5 is coated on a top surface 4a of the ring-shaped sintered body 4, which corresponds to the frictional surface 3c, with a dispenser (FIG. 4B). Then, the ring-shaped sintered body 4 is heated to and held at 80° C. to decrease the viscosity of the epoxy resin 5, accelerating impregnation of each pore of the ring-shaped sintered body 4 with the epoxy resin 5. As a result, the epoxy resin 5 permeates through an interior of the ring-shaped sintered body 4 from the top surface 4a. A portion of the ring-shaped sintered body 4 which is impregnated with the epoxy resin 5 corresponds to the frictional portion 3b. Further, the ring-shaped sintered body 4 is held at 80° C. for one hour. At this time, the epoxy resin 5 coated on the top surface 4a hardens. After that, the epoxy resin 5 hardened is removed through grinding with 320 grit silicon carbide emery paper until the top surface 4a of the ring-shaped sintered body 4 appears. Then, the top surface 4a is smoothed by lapping (polishing) it with a copper surface plate coated with polycrystalline diamond (with an average grain size of 3 μm). As a result, the frictional surface 3c is formed. Further, each part of the ring-shaped sintered body 4 is subjected to cutting to obtain the movable body 3 with desired dimensions (FIG. 4C). In the frictional portion 3b of the movable body 3 thus obtained, the pores of the ring-shaped sintered body 4 are at least partially impregnated with the epoxy resin 5. To improve resistance to wear, for example, 8000 grit silicon carbide ceramic grains may be mixed with the epoxy resin 5. Moreover, in the movable body 3 thus obtained, a length of the frictional portion 3c in a radial direction of the movable body 3 (hereafter referred to as "the radial length") is shorter than the radial length of the main body portion 3a. Thus, the amount of epoxy resin 5 to be coated is reduced, and the time period required to remove the epoxy resin 5 at a later time is shortened. The area subjected to the lapping mentioned above is reduced as well. As a result, the time period required to manufacture the movable body 3 is shortened. It should be noted that the radial length of the frictional surface 3c is set to such a length that each of the projecting portions 2a and the frictional surface 3c are able to come into contact with each other even after considering positional errors and dimensional errors of the projecting portions 2a coming into contact with the frictional surface 3c.

Figure 5A:
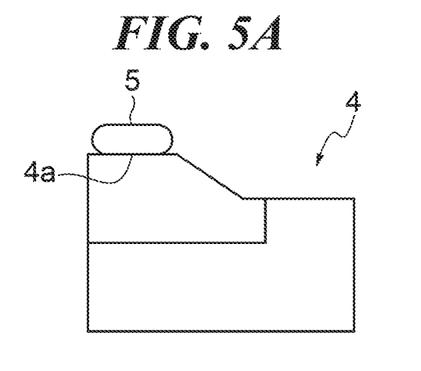
FIGS. 5A to 5F are process diagrams useful in explaining how epoxy resin behaves when the movable body is impregnated with the epoxy resin.
Figure 5B:
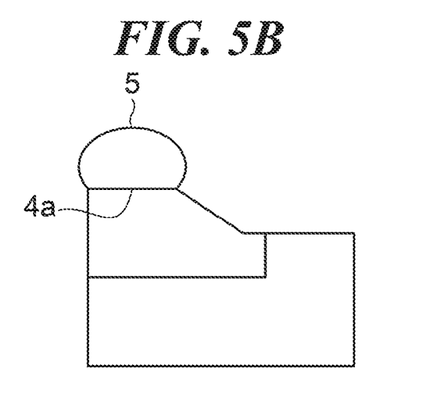

In the process of manufacturing the movable body 3, the top surface 4a of the ring-shaped sintered body 4 is coated with the epoxy resin 5 so as to impregnate the frictional portion 3b with the epoxy resin 5 (FIG. 5A). At this time, to reliably impregnate the frictional portion 3b with the epoxy resin 5 to a satisfactory level, the top surface 4a is coated with a relatively large amount of epoxy resin 5 (FIG. 5B). Here, if the epoxy resin 5 is heated for impregnation, the viscosity of the epoxy resin 5 may decrease, causing excess epoxy resin 5 to overflow from the top surface 4a and become attached to and harden on, for example, the vertical surface 3e. The epoxy resin 5 that has become attached to and hardened on the vertical surface 3e may cause interference with other members such as a lens holder and a cam ring if the vibration-type actuator 1 is applied to, for example, a lens barrel.

To avoid this problem, as described above, the movable body 3 is provided with the sloped surface 3d. The sloped surface 3d is adjacent on the outer peripheral side to the frictional surface 3c corresponding to the top surface 4a. The angle $\theta_1$ formed by the frictional surface 3c and the sloped surface is greater than 90 degrees and less than 180 degrees, and is preferably not less than 110 degrees and not more than 160 degrees. Moreover, the angle $\theta_1$ is preferably not less than 120 degrees and not more than 150 degrees. Furthermore, the angle $\theta_1$ is most preferably greater than 120 degrees and less than 150 degrees. In this embodiment, the sloped surface 3d forms the angle $\theta_1$ greater than 120 degrees and less than 150 degrees with the frictional surface 3c is provided.

Figure 5C:
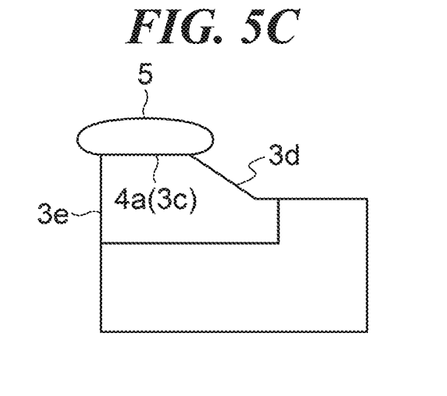
Figure 5D:
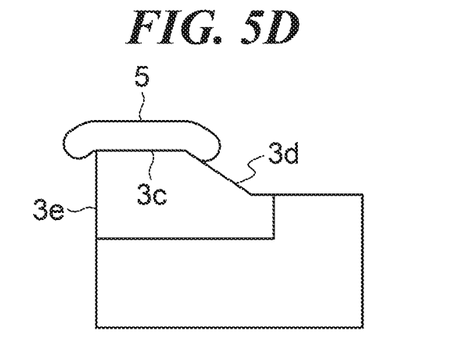
Figure 5E:
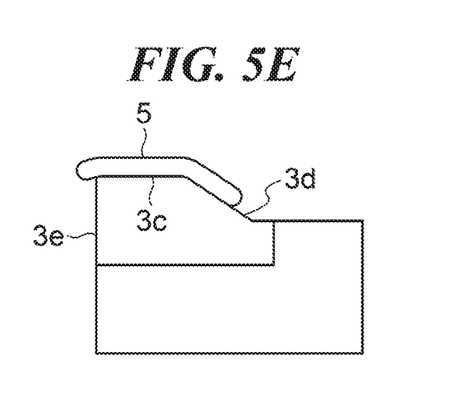
Figure 5F:
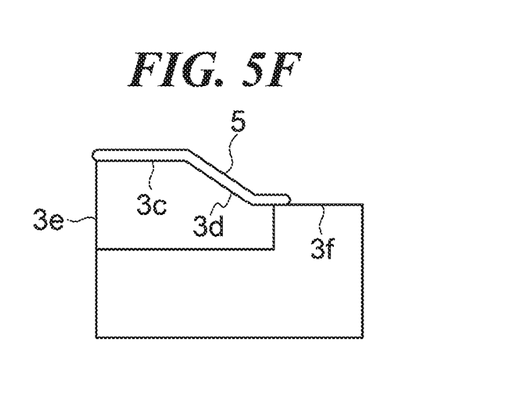

The excess epoxy resin 5 overflows from the inner peripheral side and the outer peripheral side of the top surface 4a and projects like a canopy (FIG. 5C). The excess epoxy resin 5 projecting like a canopy slowly drips to the vertical surface 3e and the sloped surface 3d while keeping its overflowing shape due to intermolecular force of the epoxy resin 5. Here, since the sloped surface 3d which forms a predetermined angle with respect to the frictional surface 3c is provided, the sloped surface 3d comes into contact with the epoxy resin 5, which is projecting like a canopy, earlier than the vertical surface 3e vertical to the frictional surface 3c (FIG. 5D). After that, the epoxy resin 5 actively flows out to the sloped surface 3d which it has come into contact with and never flows to the vertical surface 3e (FIG. 5E). Namely, since the movable body 3 has the sloped surface 3d, the movable body 3 is able to control the direction in which the epoxy resin 5 flows out (FIG. 5F). This prevents the epoxy resin 5 from becoming attached to and hardening on the vertical surface 3e and interfering with other members. Moreover, by causing the epoxy resin 5 to actively flow out to the sloped surface 3d, the amount of epoxy resin 5 remaining on the top surface 4a is minimized in an appropriate manner, and therefore, the time period required to remove the epoxy resin 5 is shortened. Furthermore, the movable body 3 has the staying surface 3f which is adjacent to the sloped surface 3d on the opposite side of the frictional surface 3c and is at a lower level than the frictional surface 3c and parallel to the frictional surface 3c with the frictional surface 3c facing upward. This enables the epoxy resin 5 flowing out to the sloped surface 3d to stay on the staying surface 3f even if the epoxy resin 5 flowing out to the sloped surface 3d overflows from the sloped surface 3d and therefore prevents the epoxy resin 5 from flowing out to a vertical surface or the like on the opposite side of the vertical surface 3e.

It should be noted that in a case where the angle $\theta_1$ is relatively large, the epoxy resin 5 which is projecting like the canopy (FIG. 5C) is more likely to come into contact with the sloped surface 3d than a case where the angle $\theta_1$ is relatively small, and hence the epoxy resin 5 is likely to flow out from the top surface 4a to the sloped surface 3d. As a result, the epoxy resin 5 is difficult to flow out from the top surface 4a to the vertical surface 3e. This prevents the epoxy resin 5 from interfering with other members such as the lens holder and the cam ring.

However, in a case where the angle $\theta_1$ is too large, the epoxy resin 5 excessively flows out from the top surface 4a to the sloped surface 3d, and hence the epoxy resin 5 is difficult to remain on the top surface 4a. As a result, the epoxy resin 5 does not impregnate the frictional portion 3b to a satisfactory extent, which is not desirable.

Moreover, in a case where the angle $\theta_1$ is relatively small, the epoxy resin 5 which is projecting like the canopy (FIG. 5C) is less likely to come into contact with the sloped surface 3d from the top surface 4a than the case where the angle $\theta_1$ is relatively large, and hence the epoxy resin 5 is difficult to flow out from the top surface 4a to the sloped surface 3d. As a result, the epoxy resin 5 is likely to remain on the top surface 4a. This ensures the epoxy resin 5 to impregnate the frictional portion 3b to the satisfactory extent.

However, in a case where the angle $\theta_1$ is too small, the epoxy resin 5 excessively remains on the top surface 4a, and hence the epoxy resin 5 is likely to flow out from the top surface 4a to the vertical surface 3e. As a result, the epoxy resin 5 is likely to interfere with other members such as the lens holder and the cam ring, which is not desirable. Moreover, in a case where the angle $\theta_1$ is too small, the epoxy resin 5 excessively remains on the top surface 4a, and hence the epoxy resin 5 is likely to be hardened excessively on the top surface 4a. As a result, a time period required for the lapping increases, which is not desirable.

The amount of epoxy resin 5 to be coated on the top surface 4a is set to such an amount that a predetermined amount of epoxy resin 5 remains on the top surface 4a even after the epoxy resin 5 impregnates the frictional portion 3b. At this time, the amount of epoxy resin 5 to be coated on the top surface 4a is determined with consideration given to changes in the viscosity of the epoxy resin 5 over time, variations in the amount of coating with dispensers, variations in the porosity of the main body portion 3a, particularly the frictional portion 3b, and so forth.

Figure 6A:
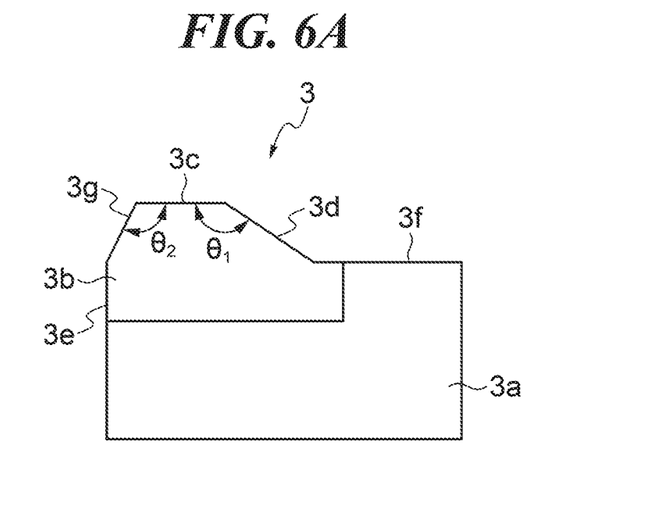
FIGS. 6A and 6B are cross-sectional views showing a first variation of the movable body in FIG. 1.
Figure 6B:
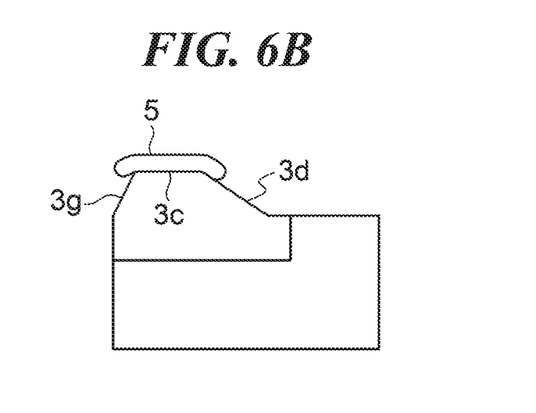

It should be noted that the shape of the movable body 3 in cross section is not limited to the above described one. For example, as shown in FIG. 6A, a sloped surface 3g (other sloped surface) may be formed on a side face of the frictional portion 3b on the inner peripheral side. The sloped surface 3g is adjacent on the inner peripheral side to the frictional surface 3c. An angle $\theta_2$ formed by the frictional surface 3c and the sloped surface 3g is less than the angle $\theta_1$ formed by the frictional surface 3c and the sloped surface 3d. The angle $\theta_1$ is most preferably greater than 120 degrees and less than 150 degrees. On the other hand, the angle $\theta_2$ is not limited to a range like the angle $\theta_1$, but may be less than the angle $\theta_1$. In a cross section vertical to the direction in which the movable body 3 moves (hereafter referred to merely as "the cross section"), an oblique side corresponding to the sloped surface 3d is longer than the other oblique side corresponding to the sloped surface 3g. When the excess epoxy resin 5 projecting like a canopy from the frictional surface 3c drips downward, the angle $\theta_2$ is less than the angle $\theta_1$, and the sloped surface 3d is closer to the excess epoxy resin 5 than the sloped surface 3g. As a result, the sloped surface 3d comes into contact with the excess epoxy resin 5 earlier than the sloped surface 3g (FIG. 6B). After that, the epoxy resin 5 actively flows out to the sloped surface 3d contacted. Namely, the epoxy resin 5 actively flows out to the sloped surface 3d than to the sloped surface 3g, and this prevents the excess epoxy resin 5 from flowing out to the sloped surface 3g. Moreover, even if the excess epoxy resin 5 comes into contact with the sloped surface 3g after coming into contact with the sloped surface 3d, the amount of epoxy resin 5 flowing out toward the sloped surface 3g is expected to be small.

Figure 7A:
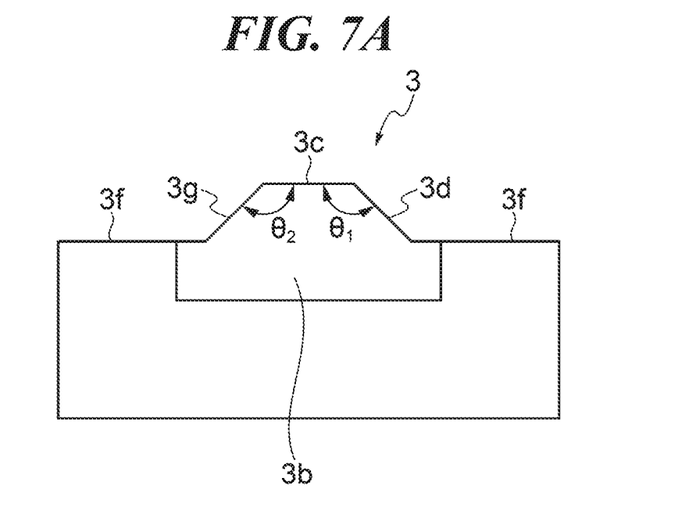
FIGS. 7A and 7B are cross-sectional views showing a second variation of the movable body in FIG. 1.
Figure 7B:
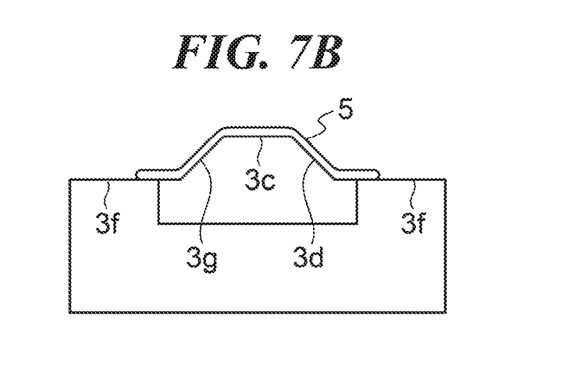

If a target to which the vibration-type actuator 1 is applied has a margin of space that permits upsizing of the movable body 3, the frictional portion 3b may be placed in the center of the movable body 3 with respect to the radial direction of the movable body 3, and the staying surfaces 3f may be provided on both sides of the frictional portion 3b (FIG. 7A). In this case, the angle $\theta_2$ formed by the frictional surface 3c and the sloped surface 3g and the angle $\theta_1$ formed by the frictional surface 3c and the sloped surface 3d may be set at the same angle. When the excess epoxy resin 5 projecting like a canopy from the frictional surface 3c drips downward, the excess epoxy resin 5 comes into contact with the sloped surface 3d and the sloped surface 3g at substantially the same time and flows out to both the sloped surface 3d and the sloped surface 3g. However, even if the epoxy resin 5 flowing out to the sloped surface 3d overflows from the sloped surface 3d, the overflowing epoxy resin 5 stays on the staying surface 3f, and also, even if the epoxy resin 5 flowing out to the sloped surface 3g overflows from the sloped surface 3g, the overflowing epoxy resin 5 stays on the staying surface 3f (FIG. 7B). Namely, the epoxy resin 5 is prevented from flowing out to and hardening in unexpected areas and interfering with other members.

A description will now be given of test results obtained using examples of the vibration-type actuator 1. First, vibration-type actuators according to examples 1 and 2 were manufactured using the movable body 3 shown in FIG. 3. For the vibration-type actuator in the example 1, the movable body 3 which had the frictional portion 3b including a sintered body obtained by hardening a sintered body of SUS4202J2 powders by quenching and then impregnated with the epoxy resin 5 mixed with ceramic grains was used. For the vibration-type actuator in the example 2, the movable body 3 comprised of a sintered body obtained by hardening a sintered body of SUS4202J2 powders by quenching and then impregnated with the epoxy resin 5 was used. It should be noted that in the example 2, no ceramic grains were mixed with the epoxy resin 5. The manufacturing method described with reference to FIGS. 4A to 4C can be applied to manufacturing of the moving bodies 3 used for the respective vibration-type actuators in the examples 1 and 2. In a comparative example 1, a vibration-type actuator which had a ring-shaped movable body comprised of a sintered body obtained by hardening a sintered body of SUS4202J2 powders by quenching was manufactured. Furthermore, in a comparative example 2, a vibration-type actuator which had a ring-shaped movable body comprised of a SUS4202J2 cast material manufactured using an ordinary stainless manufacturing method and had a frictional surface provided with a nitride layer by an ion nitriding method was manufactured. It should be noted that the moving bodies in the comparative examples 1 and 2 have the same shape as that of the movable body 3.

Next, for each of the manufactured vibration-type actuators in the examples 1 and 2 and the comparative examples 1 and 2, the movable body 3 was moved to and fro 70,000 times with rotational angles ranging from 0° to 50°, and further moved to and fro 5,000 times with rotational angles ranging from 50° to 100°. Such to-and-fro movements cause "conformability" to develop between the projecting portions 2a and the frictional surface 3c. The conformability means that the interfacial distance around the real contact area of frictional surfaces has been reduced. The development of the conformability widens the area of the projecting portions 2a which is in contact with the frictional surface 3c, and accordingly, increases the area of a part where the interfacial distance between the frictional surfaces increases. After the conformability has developed between the projecting portions 2a and the frictional surface 3c, the frictional surfaces tend to slip because they are more affected by humidity. Namely, when a frictional material and a material on the other end are in contact with each other in a fixed area (real contact portion), the distance between areas that were not in contact with each other before development of the conformability decreases after development of the conformability as a result of comparison between a case where the comfortability has not been developed (before the development of the comfortability) and a case where the comfortability has been developed (after the development of the comfortability). If there is moisture (water molecules) between two surfaces that are not in contact with each other in that state, the moisture supports a vertical drag, and therefore, the real contact area decreases to reduce shearing force (frictional coefficient) of the frictional surfaces. On the other hand, if there is no moisture between two surfaces that are not in contact with each other, the real contact area increases, and a high frictional coefficient is obtained due to increase of the real contact area. Therefore, it can be considered that the tendency of the frictional surfaces to slip varies greatly depending on whether or not there is moisture in an area where the conformability has developed. For this reason, in this test, the movable body 3 is moved to and fro as described above so as to make the effects of moisture on the frictional surfaces evident.

Figure 8:
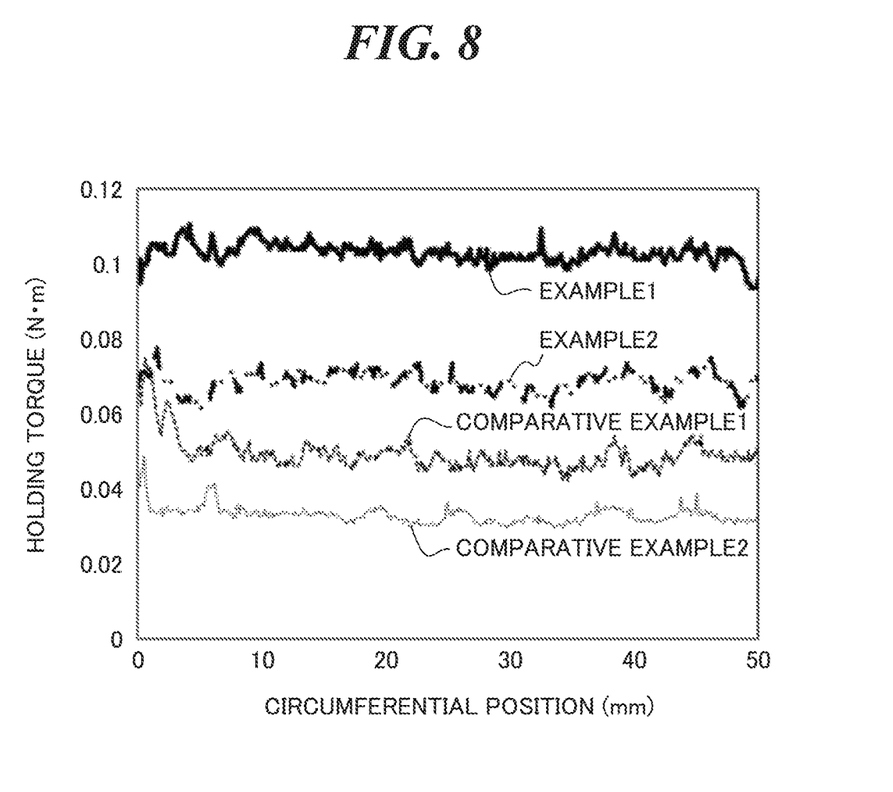
FIG. 8 is a graph showing measurement results of holding torque in vibration-type actuators after they were left for a long period of time in a humid environment.

After the to-and-fro movements, each of the vibration-type actuators was left in a humid environment at a temperature of 60° and a humidity of 90% for one to two hours and then taken out and left in a room temperature environment (at a temperature of 25° and a humidity of 50%) for two hours. After that, holding torque in the circumferential direction of the movable body 3 was measured. The aim of leaving the vibration-type actuators in the humid environment at the humidity of 90% for long hours was to cause moisture to become absorbed to the surface of the frictional surface 3c so that a water film could be formed between the frictional surface 3c and the vibrating body 2 to reduce frictional force. FIG. 8 is a graph showing test results of holding torque in the vibration-type actuators in the examples 1 and 2 and the comparative examples 1 and 2. As shown in FIG. 8, the holding torque in the vibration-type actuators in the examples 1 and 2 was greater than the holding torque in the comparative examples 1 and 2. Specifically, it was found out that when a sintered body impregnated with epoxy resin is used as a movable body in a vibration-type actuator, holding torque is maintained even after the vibration-type actuator is left in a humid environment for long hours. It was considered that this is caused by increase in the real contact area between the frictional surface 3c and the vibrating body 2 due to transfer of the impregnating epoxy resin to the frictional surface 3c of the movable body 3. Moreover, the holding torque in the vibration-type actuator in the example 1 was greater than the holding torque in the vibration-type actuator in the example 2. Specifically, it was found out that in the vibration-type actuator, when ceramic grains are mixed with impregnating epoxy resin, holding torque is maintained high even after the vibration-type actuator is left in a humid environment for long hours. It was considered that this is caused by the ceramic grains breaking the water film between the frictional surface 3c and the vibrating body 2.

As described above, a frictional material formed by impregnating a stainless sintered body with resin is able to maintain holding torque as compared to conventional frictional materials even after it is left in a humid environment for long hours. Moreover, by using the movable body 3 according to the present embodiment, resin coated on the stainless sintered body is prevented from flowing to and hardening on the side face of the movable body 3 on the inner peripheral side. This prevents degradation of driving performance of the vibration-type actuator caused by interference of hardening resin with other members.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the movable body 3, the angle $\theta_1$ formed by the frictional surface 3c and the sloped surface 3d is most preferably greater than 120 degrees and less than 150 degrees, but the angle $\theta_1$ has only to be greater than 90 degrees and less than 180 degrees. The angle $\theta_1$ is preferably not less than 110 degrees and not more than 160 degrees, and more preferably not less than 120 degrees and not more than 150 degrees. Also, the angle $\theta_2$ formed by the frictional surface 3c and the sloped surface 3g has only to be greater than 90 degrees and less than 180 degrees. Although in the vibration-type actuator 1, the ring-shaped movable body 3 is used, a rectangular parallelepiped movable body having a frictional surface from which a sintered body impregnated with epoxy resin exposes itself may be used. In this case, the rectangular parallelepiped movable body is linearly driven in a longitudinal direction by the vibrating bodies 2. It is conceivable that the vibration-type actuator 1 will be applied to various electronic apparatuses, and for example, the vibration-type actuator 1 may be applied to, a lens barrel of a camera and an industrial robot.

Figure 9:
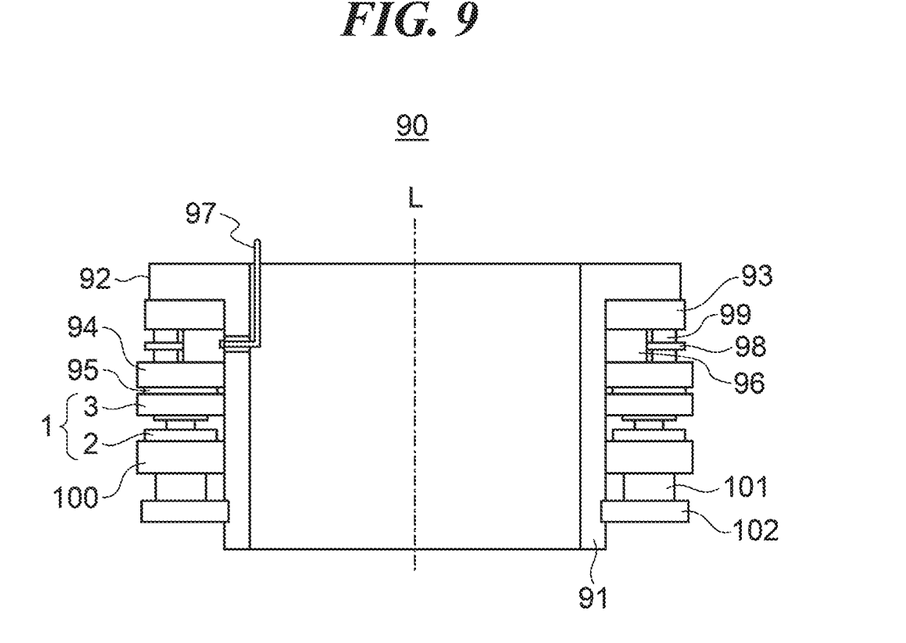
FIG. 9 is a cross-sectional view showing a lens barrel which is an electronic apparatus according to an embodiment of the present invention.

FIG. 9 is a cross-sectional view showing a lens barrel which is an electronic apparatus according to an embodiment of the present invention. The lens barrel 90 has a cylindrical lens barrel unit main body 91. Referring to FIG. 9, the lens barrel unit main body 91 has a flange 92, which projects outwardly and vertically with respect to an optical axis L, at an end thereof. On the flange 92, a manual ring 93 which is manually operated for manual focusing is placed with the optical axis L at its center. In the lens barrel 90, the vibration-type actuator 1 is placed with the optical axis L at its center so as to enclose the lens barrel unit main body 91. A ring-shaped output transmitting member 94 is placed with the optical axis L at its center and in opposed relation to the movable body 3 of the vibration-type actuator 1 across rotor rubber 95. A roller ring 96 (driven body) is placed between the output transmitting member 94 and the manual ring 93. The roller ring 96 is configured to be rotatable via driving force transmitted from the output transmitting member 94 and the manual ring 93. The roller ring 96 has an output key 97 which projects parallel to the optical axis L from an end of the lens barrel unit main body 91. The output key 97 is engaged with, for example, a cam ring and transmits rotation of the roller ring 96 to the cam ring. The roller ring 96 also has a plurality of roller shafts 98 projecting in a radial direction and a wheel-shaped roller 99 pivotally supported by the roller shafts 98. Further, a ring-shaped holding base 100 is placed with the optical axis L at its center and in a manner holding the vibrating body 2 of the vibration-type actuator 1. On an opposite side of the vibrating body 2, a leaf spring 101 abuts against the holding base 100. Further, a ring-shaped pressurization ring 102 supporting the leaf spring 101 is placed with the optical axis L at its center and near an end of the lens barrel unit main body 91. An inner peripheral side of the lens barrel unit main body 91 is engaged with the pressurization ring 102 by a screw or bayonet structure. The pressurization ring 102 is moved along the optical axis L by rotating it around the lens barrel unit main body 91 to compress the leaf spring 101. The compressed leaf spring 101 presses the holding base 100 toward the vibration-type actuator 1. As a result, a pressing force acts on the vibrating body 2 of the vibration-type actuator 1, bringing the vibrating body 2 into pressure contact with the movable body 3. When vibrations are excited in the vibrating body 2, the movable body 3 is frictionally driven in the circumferential direction, and the roller ring 96 being in contact with the output transmitting member 94 and the rotor rubber 95 moves in the circumferential direction as well. At this time, the output key 97 of the roller ring 96 rotates the cam ring engaged with the output key 97 and causes an auto-focusing operation of the lens barrel. It should be noted that the vibration-type actuator 1 may be used not only to cause the auto-focusing operation of the lens barrel but also to cause a zooming operation of the lens barrel and may also be used to drive an image pickup device of a camera and actuate a lens or the image pickup device when correcting for camera shake.

Figure 10:
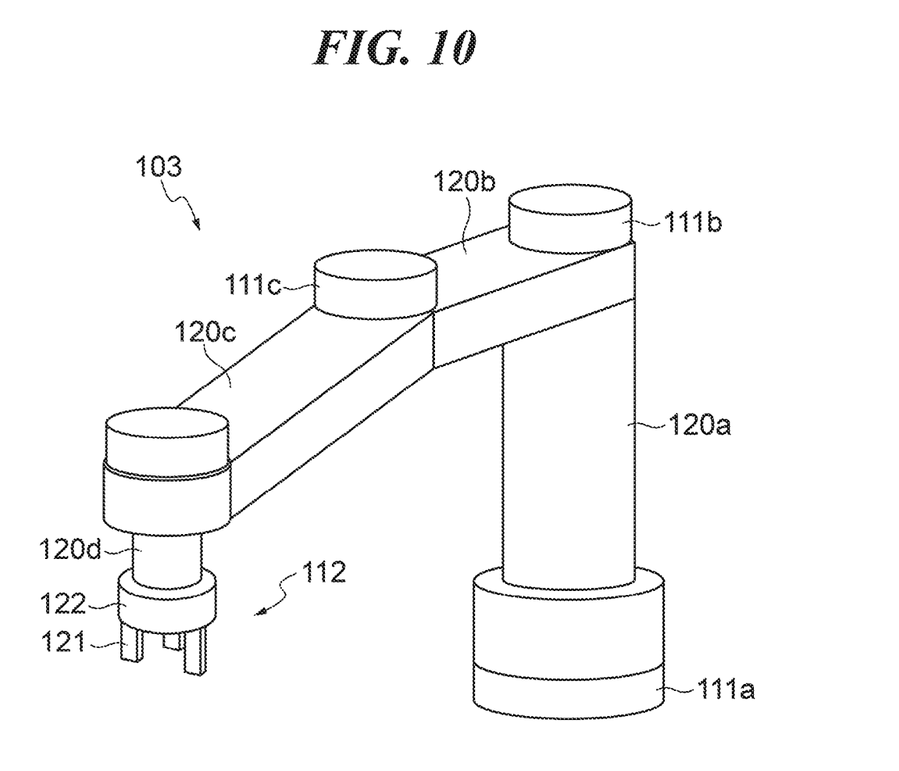
FIG. 10 is a perspective view showing an industrial robot which is an electronic apparatus according to an embodiment of the present invention.

FIG. 10 is a perspective view showing an industrial robot which is an electronic apparatus according to an embodiment of the present invention. Referring to FIG. 10, the robot 103 is, for example, a horizontal articulated robot and equipped with the vibration-type actuator 1. The robot 103 has a hand unit 112 (driven body) provided at an end, a plurality of arms 120a to 120d (driven bodies), and arm articulated units 111a to 111c which connect the arms 120a to 120d to one another or are provided at ends of the 120a. The arm articulated units 111a to 111c changes crossing angles of the arms 120b and 120c to which they are adjacent or rotates the arms 120a and 120b about their own thrust axes. The hand unit 112 has an arm 120d, a holding unit 121 attached to an end of the arm 120d, and a hand articulated unit 122 which connects the arm 120 and the holding unit 121 together. The hand articulated unit 122 rotatively drives the holding unit 121. It is preferred that a vibration-type actuator used for bending actions of the arm articulated units 111a to 111c and holding actions of the hand unit 112 in the robot 103 has low rotational speed and high torque TN characteristics (drooping characteristic describing a torque-speed relationship). Here, the vibration-type actuator 1 of the frictionally-driving type using the piezoelectric elements 2c has low rotational speed and high torque TN characteristics and is thus suitably used for the arm articulated units 111a to 111c and the hand unit 112 of the robot 103.

This application claims the benefit of Japanese Patent Application No. 2017-131981, filed Jul. 5, 2017, which is hereby incorporated by reference herein in its entirety.

What is claimed is:
1. A vibration-type driving apparatus comprising:
    a vibrating body configured to use an electro-mechanical energy conversion element and an elastic body; and
    a movable body configured to be brought into pressure contact with the vibrating body,
    wherein the vibration-type driving apparatus moves the vibrating body and the movable body relatively to each other through vibrations excited in the vibrating body, the movable body has a frictional surface that includes a sintered body impregnated with at least resin and comes into contact with the vibrating body, the movable body also has a sloped surface adjacent to the frictional surface in a cross section perpendicular to a direction in which the vibrating body and the movable body move relatively to each other, and an angle formed by the frictional surface and the sloped surface of the movable body is greater than 90 degrees and less than 180 degrees.

2. The vibration-type driving apparatus according to claim 1, wherein the angle formed by the frictional surface and the sloped surface of the movable body is not less than 110 degrees and not more than 160 degrees.

3. The vibration-type driving apparatus according to claim 1, wherein the angle formed by the frictional surface and the sloped surface of the movable body is greater than 120 degrees and less than 150 degrees.

4. The vibration-type driving apparatus according to claim 1, wherein the sintered body is a stainless sintered body, and a surface porosity which is a percentage of pore space in the frictional surface is not less than 5% and not more than 30%.

5. The vibration-type driving apparatus according to claim 1, wherein the movable body has a staying surface on an opposite side of the frictional surface and adjacent to the sloped surface, and in a case where the frictional surface faces upward, the staying surface is parallel to the frictional surface or sloped down toward the sloped surface.

6. The vibration-type driving apparatus according to claim 1, wherein ceramic grains are mixed with the resin.

7. The vibration-type driving apparatus according to claim 1, wherein the sintered body comprises a martensite sintered body that has been hardened by quenching.

8. The vibration-type driving apparatus according to claim 1, wherein the movable body has another sloped surface on an opposite side of the sloped surface and adjacent to the frictional surface, and an angle formed by the frictional surface and the other sloped surface of the movable body is less than the angle formed by the frictional surface and the sloped surface of the movable body.

9. The vibration-type driving apparatus according to claim 1, wherein the movable body has another sloped surface on an opposite side of the sloped surface and adjacent to the frictional surface, an angle formed by the frictional surface and the other sloped surface of the movable body is greater than 90 degrees and less than 180 degrees, and in a cross section of the movable body which is perpendicular to a direction in which the vibrating body and the movable body move relatively to each other, an oblique side corresponding to the sloped surface is longer than another oblique surface corresponding to the other sloped surface.

10. The vibration-type driving apparatus according to claim 1, wherein resin or resin and ceramic grains are present in the sloped surface.

11. The vibration-type driving apparatus according to claim 1, wherein the movable body is shaped like a ring, and the frictional surface and the sloped surface are formed over the whole circumference of the movable body.

12. The vibration-type driving apparatus according to claim 1, wherein the movable body is shaped like a ring, and in the cross section, the sloped surface is placed on an outer peripheral side of the movable body as compared to the frictional surface.

13. An electronic apparatus comprising:

a vibration-type driving apparatus;

a driven body configured to be driven by the vibration-type driving apparatus, wherein vibration-type driving apparatus comprises a vibrating body that uses an electro-mechanical energy conversion element and an elastic body, and a movable body that is brought into pressure contact with the vibrating body, the vibration-type driving apparatus moves the vibrating body and the movable body relatively to each other through vibrations excited in the vibrating body, the movable body has a frictional surface that includes a sintered body impregnated with at least resin and comes into contact with the vibrating body, the movable body also has a sloped surface adjacent to the frictional surface in a cross section perpendicular to a direction in which the vibrating body and the movable body move relatively to each other, and an angle formed by the frictional surface and the sloped surface of the movable body is greater than 90 degrees and less than 180 degrees.

14. The electronic apparatus according to claim 13, wherein the electronic apparatus is an image pickup apparatus or a robot.

15. A movable body comprising:

a frictional surface configured to be include a sintered body impregnated with at least resin; and a sloped surface adjacent to the frictional surface, wherein an angle formed by the frictional surface and the sloped surface is greater than 90 degrees and less than 180 degrees.

16. The movable body according to claim 15, wherein the angle formed by the frictional surface and the sloped surface is not less than 110 degrees and not more than 160 degrees.

17. The movable body according to claim 15, wherein the angle formed by the frictional surface and the sloped surface is greater than 120 degrees and less than 150 degrees.

18. The movable body according to claim 15, wherein the sintered body is a stainless sintered body, and a surface porosity which is a percentage of pore space in the frictional surface is not less than 5% and not more than 30%.

19. The movable body according to claim 15, comprising a staying surface on an opposite side of the frictional surface and adjacent to the sloped surface, wherein in a case where the frictional surface faces upward, the staying surface is parallel to the frictional surface or sloped down toward the sloped surface.

* * * * *